United States Patent [19]
Smith

[11] Patent Number: 5,500,776
[45] Date of Patent: Mar. 19, 1996

[54] SELF-CALIBRATION FOR COMPUTER DISK READ/WRITE OFFSETS

[75] Inventor: Robert F. Smith, San Jose, Calif.

[73] Assignee: Seagate Technology, Inc., Scotts Valley, Calif.

[21] Appl. No.: 169,714

[22] Filed: Dec. 16, 1993

[51] Int. Cl.⁶ ........................................ G11B 5/596
[52] U.S. Cl. ............... 360/77.04; 360/76; 360/77.08
[58] Field of Search ..................... 360/77.04, 77.06, 360/77.08, 78.08, 76

[56] References Cited

U.S. PATENT DOCUMENTS

| | | | |
|---|---|---|---|
| 4,802,033 | 1/1989 | Chi | 360/77.04 |
| 4,866,548 | 9/1989 | Rudi | 360/78.02 X |
| 5,023,733 | 6/1991 | Koga et al. | 360/77.04 |
| 5,073,833 | 12/1991 | Best et al. | 360/77.25 |
| 5,109,502 | 4/1992 | Sasamoto et al. | 395/425 |
| 5,208,711 | 5/1993 | Kitamura et al. | 360/78.04 |
| 5,257,149 | 10/1993 | Meyer | 360/78.08 X |
| 5,321,564 | 6/1994 | Takahashi et al. | 360/77.04 |

FOREIGN PATENT DOCUMENTS

0267711A2 5/1988 European Pat. Off. .
0285452A3 5/1988 European Pat. Off. .

OTHER PUBLICATIONS

Brede, "Transducer Control for Sector Servo" IBM Tech. Disclosure Bulletin, vol. 21, No. 5, Oct. 1978, p. 2005.
McEfee, "Read/Write Servo Magnetic Head" IBM Tech. Disclosure Bulletin, vol. 20, No. 9, Feb. 1978, pp. 3673–3674.
Schwartz, "Compensation for Element-to-Element Misregistration in a Dual Element Head" IBM Tech. Discl. Bulletin, vol. 17, No. 1, Jun. 1974, pp. 217–218.

*Primary Examiner*—Aristotelis Psitos
*Assistant Examiner*—James T. Wilson
*Attorney, Agent, or Firm*—LaRiviere, Grubman & Payne

[57] ABSTRACT

For disk drives having dual element heads, an invention for providing self-calibration of hard-disk writer elements to reader elements offsets. A method is provided for positioning a reader element for reading information on a disk, and from the information read, determining a reference line for the writer element. The method may be incorporated into a hard-disk in the form of a self-calibration routine in memory. The self-calibration routine may be used for computing offsets for separate writer/reader elements in a dual head assembly. Also, apparatus are provided for self-calibration of hard-disk writer to reader element offsets.

40 Claims, 5 Drawing Sheets

SELF-CALIBRATION FOR COMPUTER DISK READ/WRITE OFFSETS

TECHNICAL FIELD

The invention relates to computer disk drives. More specifically, the invention relates to servocontrol of read/write heads of a hard-disk drive. In particular, the invention is directed at hard-disk drives with embedded servo signals and dual element heads.

BACKGROUND ART

Disks are a common means for data storage. Data storage is accomplished by altering small areas of the disk surface. The small areas of the disk surface are altered to represent binary ones and zeros.

As is known, read and write heads are typically used for altering the disk surface. Some hard-disk drives use dual element heads. Dual element heads comprise separate reader and writer elements. This allows the writer element to be optimized for writing, and allows the reader element to be optimized for reading. One typical application has an inductive write element and a magnetoresistive read element.

Because the writer and reader elements of a dual element head assembly are at different physical locations, the same information may not be written and read simultaneously with both of those elements. As the reader element is optimized for reading, it is a good choice for reading both data and servo information. As the writer element is optimized for writing, it is a good choice for writing both data and servo information.

However, because dual element heads are at different physical locations, and because different elements are used for reading and writing, a certain amount of offset must be introduced into the servocontrol system. Introducing offset into the servocontrol system provides "trackwise" alignment between read and write elements.

Issues of trackwise alignment for dual element heads are disclosed in: U.S. Pat. No. 5,073,833 (Best et al.); U.S. Pat. No. 4,802,033 (Chi); IBM Technical Disclosure Bulletin, vol. 20, no. 9, February 1978 (McEfee); IBM Technical Disclosure Bulletin, vol. 21, no. 5, October 1978 (Brede); and IBM Technical Disclosure Bulletin, vol. 17, no. 1, June 1974 (Schwarz).

In Best et al., two sets of servo information are generated for each data track on the disk. These sets are radially displaced by a distance equal to the misalignment between the read and write heads. One set is generated with the write head. The other set is generated with the write head, while the read head is used for positioning using the first written set. The sets are then used to position the heads for reading and writing.

In Chi, the trackwise disparity between heads is first measured and then memorized. A self-calibrating algorithmic routine generates a bias to account for the disparity. Chi describes several algorithms for this purpose. In the Disparity Calibration Routine description, a counter is incremented to re-position the head. The signal strength is then detected. Next, the counter is decremented to again re-position the head. The signal strength is then again detected. This is used to determine whether the heads are in alignment.

To write servo information to a disk surface, a servowriter may be used. A servowriter is a machine dedicated to writing servo signals on one or more disks of a disk pack. The servowriter is typically used in the factory. Thus, information regarding servocontrolling the disk drive may be stored on dedicated areas of disk surfaces at the factory. In some dedicated disk drives, one or more heads are reserved for use by the servocontrol system. Other systems use embedded servo signals.

In embedded servo signal drives, servo information is written upon and between data storage tracks on disks of the disk pack. Servo information is typically not written to the same physical location as data in such systems. In embedded servo signal drives, servo information generally comprises a "track number code" and an "error code". The track number code is used to generate a location signal, and the error code is used to generate an error signal proportional to distance and direction from a center of a desired track. The error code is usually valid over only a limited range, such as plus or minus one track front a center line. When used in combination with a track number code, a larger range of positioning information is available. This range varies from application to application, and may include all encoded locations over all surfaces of the disk pack.

DISCLOSURE OF INVENTION

The present invention is directed at disk drives having embedded servo signals and dual element heads. Dual element heads have separate reader and writer elements. In particular, dual element heads may have magnetoresistive reader elements and thin film writer elements physically spaced apart on the same head assembly. Thus, the present invention may be practiced with hard-disk drives using magnetically alterable media. However, it should be understood that the present invention may also be practiced with hard-disk drives using dedicated platter for servo information, i.e., dedicated disk drives, where a dual element head assembly is for servo use only.

The present invention provides a system and method for self-calibration of computer disk read/write (R/W) offsets. As explained above, the physical displacement between separate writer and reader elements of dual element heads calls for an offset to be introduced. The offset must be provided to the servocontrol system. Introducing an amount of offset into the servocontrol system provides the information necessary for the servomotor to move the actuator arm to the desired position. The offset information is used to provide reader and writer elements to be positioned relative to a particular track on the disk at the same desired location, i.e., trackwise alignment.

To determine the amount of offset, information is written at locations on disks of the disk pack. The writer element is positioned at determined locations for each write operation. This may be done in a quadrature pattern. The reader element is then used to read the information written to the disk. Reference locations are used to position the reader element. The amount of information read is used to provide relative reference values. The relative reference values may be written to the disk with the writer element as servo bursts. By comparing a reference location for positioning a reader element to a difference between reference values, an amount of offset may be determined.

Thus, with the present invention, the disk drive may now be used to measure offsets during the manufacturing process, including after hard-disk drive assembly. Moreover, by reserving specific areas of the disk pack for scratch pad purposes, the disk drive may also be used to measure offsets over its useful life. This is to account for changes which occur over time due to environmental changes and use.

Other features of the present invention are disclosed or apparent in the section entitled "BEST MODE(S) FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Invention. In the drawing.

Figure 1:
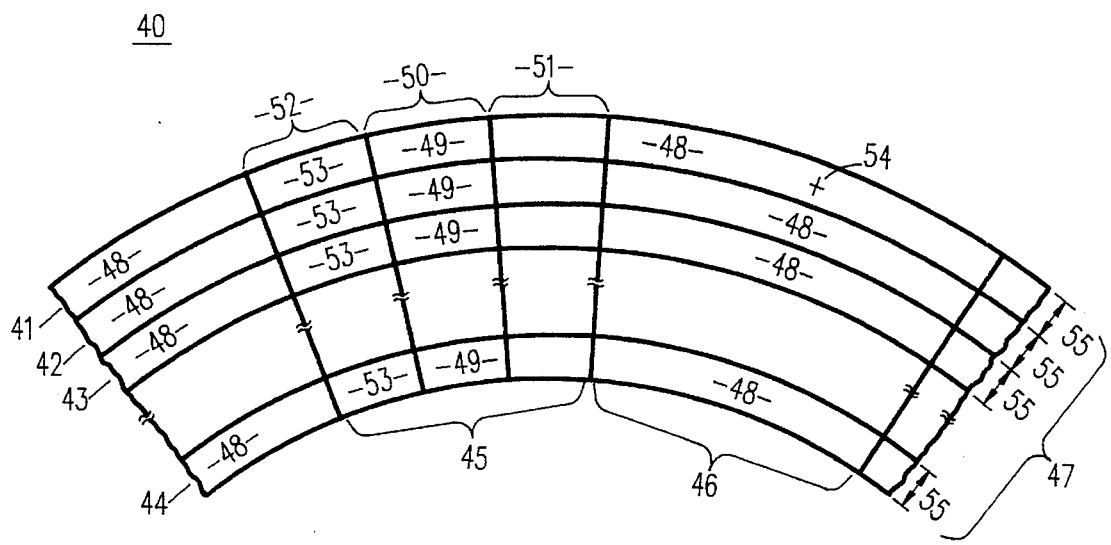
FIG. 1 is a cut-away elevation view of a portion of a disk according to the present invention.

Reference numbers refer to the same or equivalent parts of the present invention throughout the several figures of the drawing.

BEST MODE(S) FOR CARRYING OUT THE INVENTION

As hard-disk drives, disk surfaces, servocontrol systems, dual element read and write heads are all known in the art, in order to avoid confusion while enabling those skilled in the art to practice the claimed invention, this specification omits many details with respect to those items.

Disk with Embedded Servo Signals

Referring to FIG. 1, a cut-away elevation view of a disk 40 is shown. Disk 40 comprises tracks 1 to n, reference numbers 41 to 44, respectively. Disk 40 is of a type used in disk drives with embedded servo signals. Usable disk surface 47 is divided into at least one data storage sector 46 and servo information sector 45. Servo information sectors 45 comprise optionally at least one track information sector 52, optionally at least one scratch pad sector 51, and at least one error information sector 50. Servo information sectors 45 may be disposed around disk 40 between adjacent data storage sectors 46.

Those tracks where servo information is written to and read from are servo tracks. Those tracks where data information is written to and read from are data tracks. Typically, servo information is not written in data tracks. In other words, servo tracks and data tracks are predefined areas on a disk surface, which are not typically information exchangeable areas. Although, areas within a servo track may be modified to restrict usage of a particular data track, i.e., a bad R/W track may be "flagged" in a preceding servo track.

Data storage sectors 46 comprise n data storage tracks 48. In the preferred embodiment of the present invention, servo information sectors 45 comprise 2n servo tracks. In other words, there are two servo track for each data track in the preferred embodiment of the present invention.

Each track 41 to 44 has a track width 55. This is commonly referred to as the track pitch. Typically, both reader and writer element are narrower than track pitch 55. Thus, for dual element heads, the reader element and the writer element would each be narrower than track pitch 55. Moreover, generally, the reader element has a smaller head width than the writer element, e.g., head width 56 as illustratively shown in FIG. 2. In most applications, it is desirable to have head width centered to and therefore within track pitch, as head width for each element is narrower than track pitch. In any event, aligning head width to track pitch at a desired alignment does not always occur. In which case, head width is skewed with respect to track pitch.

Scratch pad sectors 51 may optionally be included on disk surface 47. Scratch pad sectors 51 allow servo information to be recorded thereon after a hard-disk drive has left the manufacturer's factory. Hence, as the operating environment changes (e.g. temperature, humidity, etc.), adjustments for proper servocontrolling may be required. The adjustment information may be determined, as explained elsewhere herein, and recorded on scratch pad sectors 51. This information may then be used for servocontrol adjustments due to changes in operating environment.

While a format for disk 40 has been shown, it is not intended to be the sole embodiment for an embedded servo signal format for use with the present invention. Other well-known varieties of formats may be used.

Determining the Offset

Figure 2:
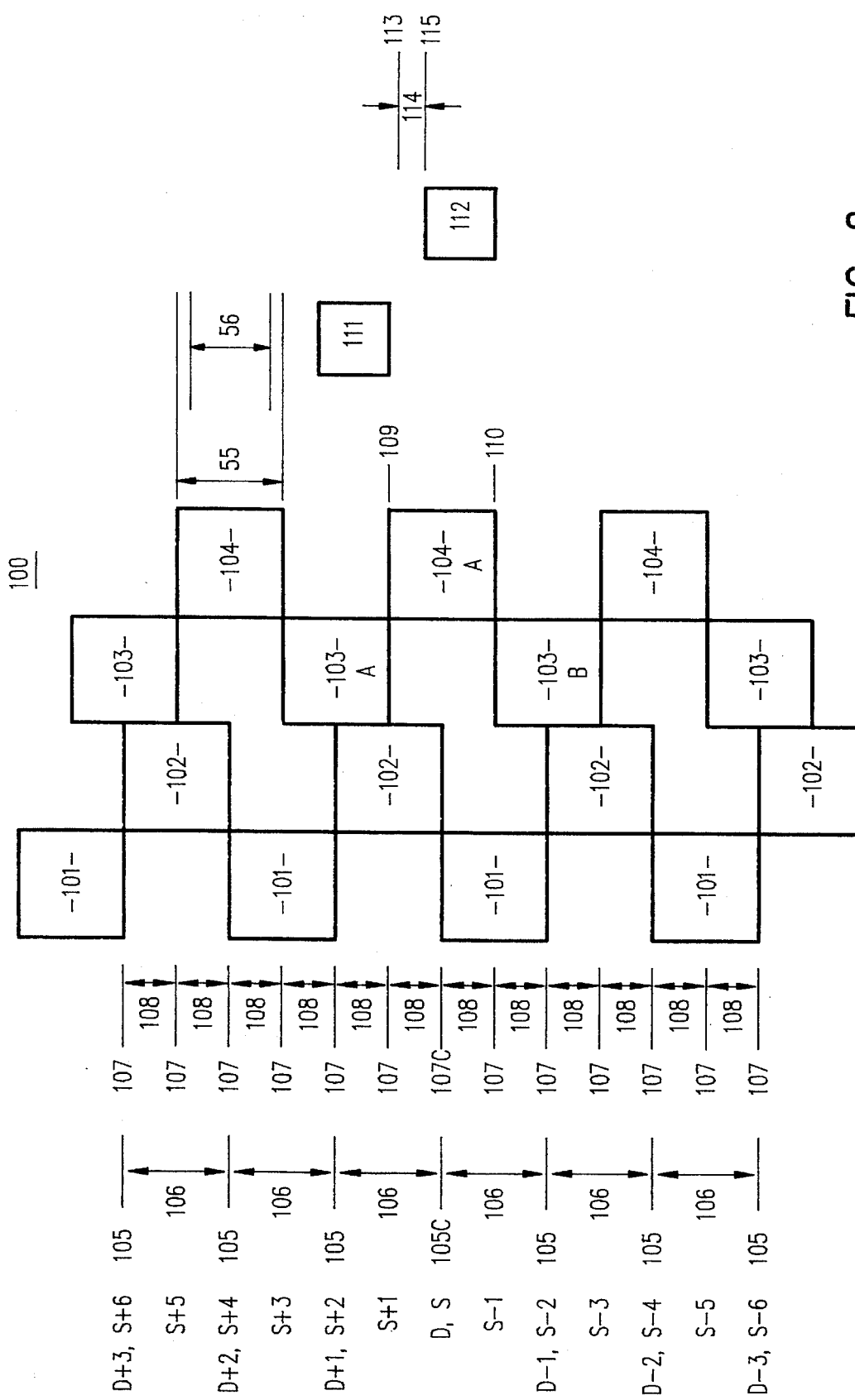
FIG. 2 is a diagram illustrating self-calibration of offsets according to the present invention.

Referring now to FIG. 2, a diagram for determining writer element to reader element offset is provided. The diagram illustratively shows a quadrature servo system. This type or system is used for purposes of linearity, and is typically preferred. However, systems other than a quadrature servo system may be employed when practicing the present invention. Also, the diagram illustratively shows a disk drive using embedded servo signals.

As shown, head width 56 is narrower than data track pitch 106 and wider than servo track pitch 108. Because the same heads are used for both reading and writing file data and servo information, the servo track pitch will be one-half of the data track pitch. In other words, the reader element is used for reading both servo and data tracks, and the writer element is used for writing both servo and data tracks.

The diagram comprises burst areas 101, 102, 103 and 104. Burst areas 101 and 102 represent data tracks, and burst areas 103 and 104 represent servo tracks. It is assumed that data track centerlines 105 are located at locations where equal areas of burst 101 and burst 102 are recovered by the element used for servoing. Thus, if a reader element reads equal areas for burst 101 and then burst 102, the centerline is the zero value location between the bursts, e.g., a zero voltage value.

Data track centerlines 105 are at locations where equal areas of bursts are recovered. However, other locations may be used when practicing the present invention without departing from the spirit and scope of the claimed invention.

As stated above, a quadrature pattern is described. In quadrature pattern 100, bursts 101 to 104 are written to a disk 40 by a servowriter. Data track pitch 106 is the distance between data track centerlines 105. Servo track pitch 108 is one-half data track pitch 106, and there are two servo tracks for each data track. Thus, servo track centerlines 107 are at locations where equal areas of bursts 101 and 102 are recovered, as well as, where equal areas of bursts 103 and 104 are recovered. However, other locations may be used when practicing the present invention without departing from the spirit and scope of the claimed invention.

Data track centerlines 105 are centerlines for data tracks D−3, ..., D, ..., D+3, and servo track centerlines 107 are centerlines for servo tracks S−6, ..., S, ... S+6. For this embodiment, locations for centerlines for quadrature pattern 100 are burst 101 equal to burst 102 and burst 103 equal to burst 104.

For quadrature pattern 100, servo commutation is set to occur where equal areas of bursts 103 and 104 are recovered. Servo commutation is described with reference to FIG. 5.

Figure 5:
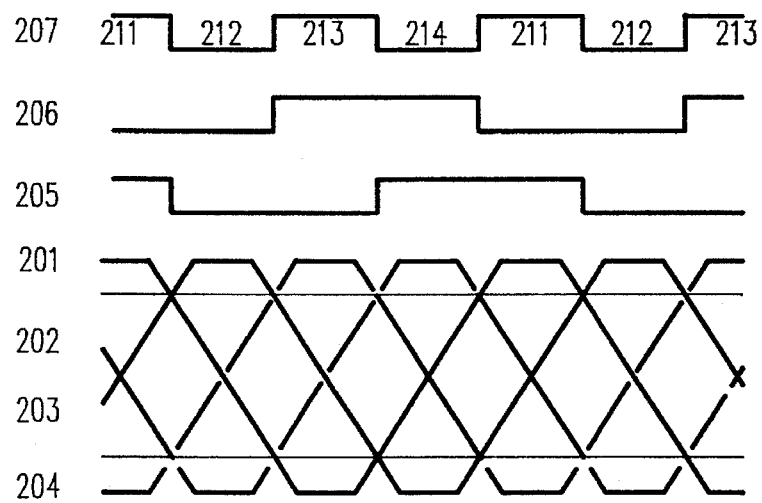
FIG. 5 is a plurality of signal diagrams related to servo commutation for a quadrature pattern.

Referring to FIG. 5, signals 201 through 207 are shown. Signal 201 is for burst area 101 minus 102. Signal 202 is for burst area 103 minus 104. Signal 203 is for burst area 104 minus 103. Signal 204 is for burst area 102 minus 101. Signal 205 is for signal 201 greater than signal 203. Signal 206 is for signal 204 greater than signal 202. Commutation occurs according to signal 207. As signal 207 is resolved from signals 205 and 206, regions 211, 212, 213 and 214 correspond to signals 202, 201, 203 and 204, respectively.

It should be noted that signals 201 through 204 correspond to a quadrature pattern where there is one servo track for each data track. Therefore, it should be understood that the linearity of signals 201 through 204 will be improved for the case of two servo tracks for each data track. Also, it should be understood that the servo system may use the above-described commutation as its normal commutation, or may use the above-described commutation for offset finding servoing. In the latter case, after determining centerline 113(shown in FIG.2), the servo system may be set to its normal commutation, i.e., non-offset finding servo commutation.

Referring to FIG. 2, offset one-half data track in the plus direction from data track centerline 105C is servo offset 109. Servo offset 109 is a location along which the reader element is servoed. Servo offset 109 is the location 103A minus 104A. The reader element is thus centered to 103A−104A=0. The reader element reads part of bursts 103A and 104A, as it passes over those burst areas.

A signal strength will be determined from reading part of bursts 103A and 104A. The signal strength may be thought of as an area or an amplitude. This often depends on the type of detector used. For example, an area detector or a peak detector may be used when practicing the present invention. For purposes of explanation, signal strength will be referred to as an area. However, it should be understood that associating a value for the signal strength also applies.

Area 111 is then written to disk surface 47. Area 111 indicates where the writer element was when the reader element was centered along servo offset 109. Area 111 is written with the writer element. Area 111 is written to disk surface 47 in the same frequency used for a servo burst.

Offset one-half data track in the minus direction from data track centerline 105C is servo offset 110. Servo offset 110 is a location along which the reader element is servoed. Servo offset 110 is the location 104A−103B. The reader element is thus centered to 104A−103B=0. The reader element reads part of bursts 104A and 103B, as it passes over those burst areas.

A signal strength will be determined from reading part of bursts 104A and 103B. Again, the signal strength may be thought of as an area or an amplitude.

Area 112 is then written to disk surface 47. Area 112 indicates where the writer element was when the reader element was centered along servo offset 110. Area 112 is written with the writer element. Area 112 is written to disk surface 47 in the same frequency used for a servo burst.

By reading servo track bursts 103A, 104A and 103B, and writing areas 111 and 112, an offset between writer and reader elements may be determined. The amount of offset may be read directly from areas 111 and 112 with use of servo position error circuitry. It should be understood that servo bursts 103 and 104 have previously been written to disk 40 with a servowriter.

By subtracting area 111 from area 112, a centerline 113 for the writer element relative to a zero value location between data burst areas, e.g., bursts areas 102 and 101 is determined. Thus, the difference between centerline 113 for the writer element and centerline 115 (e.g., for zero value data location 102 minus 101, as shown with reference to data track centerline 105C and associated servo track centerline 107C) for the reader element is the offset between the writer element and associated reader element, namely, reader/writer offset 114. Therefore, centerline 113 for the writer element actually represents the measured error. If centerline 113 corresponded exactly to centerline 115, there would be no offset measured.

Centerline 113 represents a location for a corresponding centerline for associated data track and servo track centerlines according to the reader element. In other words, centerline 113 may be thought of as a bisection location between two bursts read by the reader element and written by the writer element. Thus, it should be understood that centerline 113 may also be determined by linear interpolation. Linear interpolation may be preferred, especially when amplitudes are written instead of areas 111 and 112.

In the quadrature pattern of FIG. 2, the bisection location is associated with servo and data track centerlines 107C and 105C, as corresponding to quadrature pattern 100. Therefore, if centerline 113 is not aligned with centerlines 107C and 105C, the reader element of a particular head assembly is not aligned with the associated writer element of the head assembly. In which case, an amount of offset 114 may be introduced into the servocontrol system to re-position the reader element for alignment with the associated writer element. Or, alternatively, the writer element may be re-positioned with respect to the reader element.

Notably, the present invention may be used for all of the servo and data tracks on the disk surfaces of a hard-disk drive. Therefore, in hard-disk drives having at least one dedicated servo disk surface, servo information may be written to disk surfaces in accordance with the present invention. Thus, the present invention may be used with dedicated hard-disk drives to determine offsets between reader and writer elements of dual head assemblies.

Moreover, the above described process may be reversed. Rather than offsetting off the reader element, offset may be determined by servoing off the writer element. For example, rather than writing the information with the writer element, the writer element may be used to read information. Also, as the writer element may be used to read, the reader element may be used to write information, unless and except when the reader element is incapable of writing information, e.g., when the reader element is a magnetoresistive head. Thus, when the reader element may be used to write information, the process may be reversed for servocontrol off the writer element.

Figure 3:
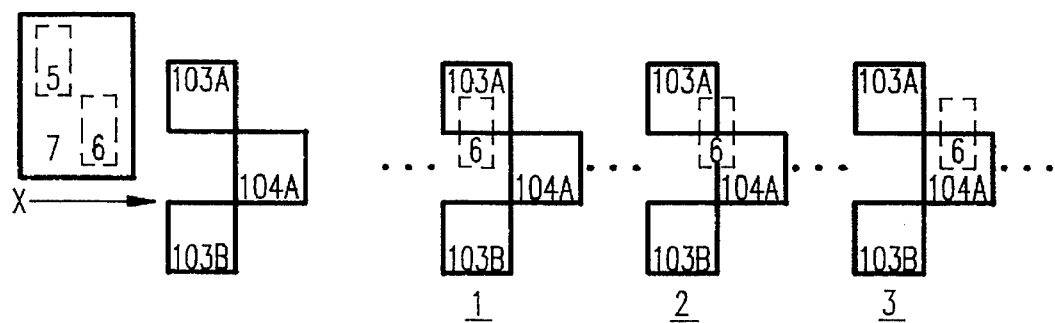
FIGS. 3–4 are diagrams for illustrating how an offset value is determined according to the present invention.
Figure 4:
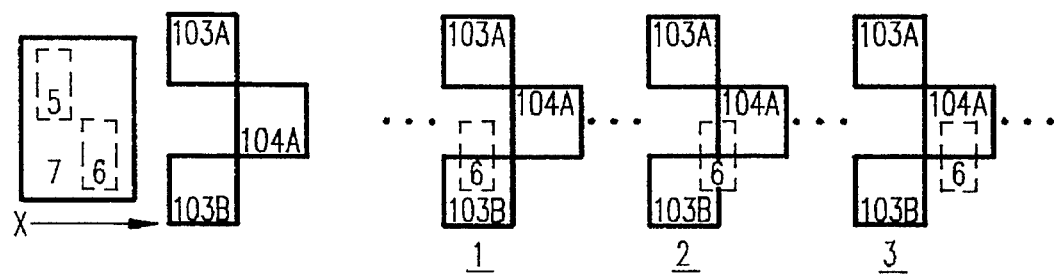

Referring to FIGS. 3–4, graphical representations of the above-described process for servocontrolling off the reader element are provided.

Head assembly 7 comprises separate reader element 6 and writer element 5. As the servowriter has already written bursts 103A, 104A and 103B as equal areas, servocontrolling may begin with reader element 6. With reference to reader element 6, zero value reference centerlines exist at 103A minus 104A and 104A minus 103B. By servocontrolling reader element 6 based on referenced centerline locations 103A-104A and 104A-103B, reader element 6 will likely pass over areas 103A, 104A and 103B. This is illustratively shown with respect to positions 1–3, as assembly 7 travels in the x-direction.

Referring to FIGS. 3 and 4, as reader element 6 passes over portions of burst areas 103A, 104A, and 103B, as described above, the portions passed over may be read with reader element 6. These read portions may then be written to disk surface 47 in the same frequency used for writing a servo burst. This step of writing the read portions may be accomplished with writer element 5.

As described elsewhere in this specification, these read portions written to disk surface 47 may then be used to locate centerline 113 (as shown in FIG. 2). Centerline 113 may be determined by subtraction, linear interpolation, or other well-known means.

Also, the amount of offset may be read directly from areas 111 and 112 with use of servo position error circuitry. For example, the servo position demodulator may be used. These circuits are known and are for measuring positioning error associated with head assemblies of a hard-disk drive.

While the above process has been described with respect to one writer element and its associated reader element, it should be understood that a plurality of dual element head assemblies are typically used in a hard-disk drive. Thus, in the more generalized case, the present invention may be practiced with more than one dual element head assembly of a hard-disk drive. Also, because writer to reader element adjustments are made with reference to each other, any error inherent in the system is neutralized. In other words, system error has less of an effect because it is incorporated into the offset measurement.

System Application

Figure 7:
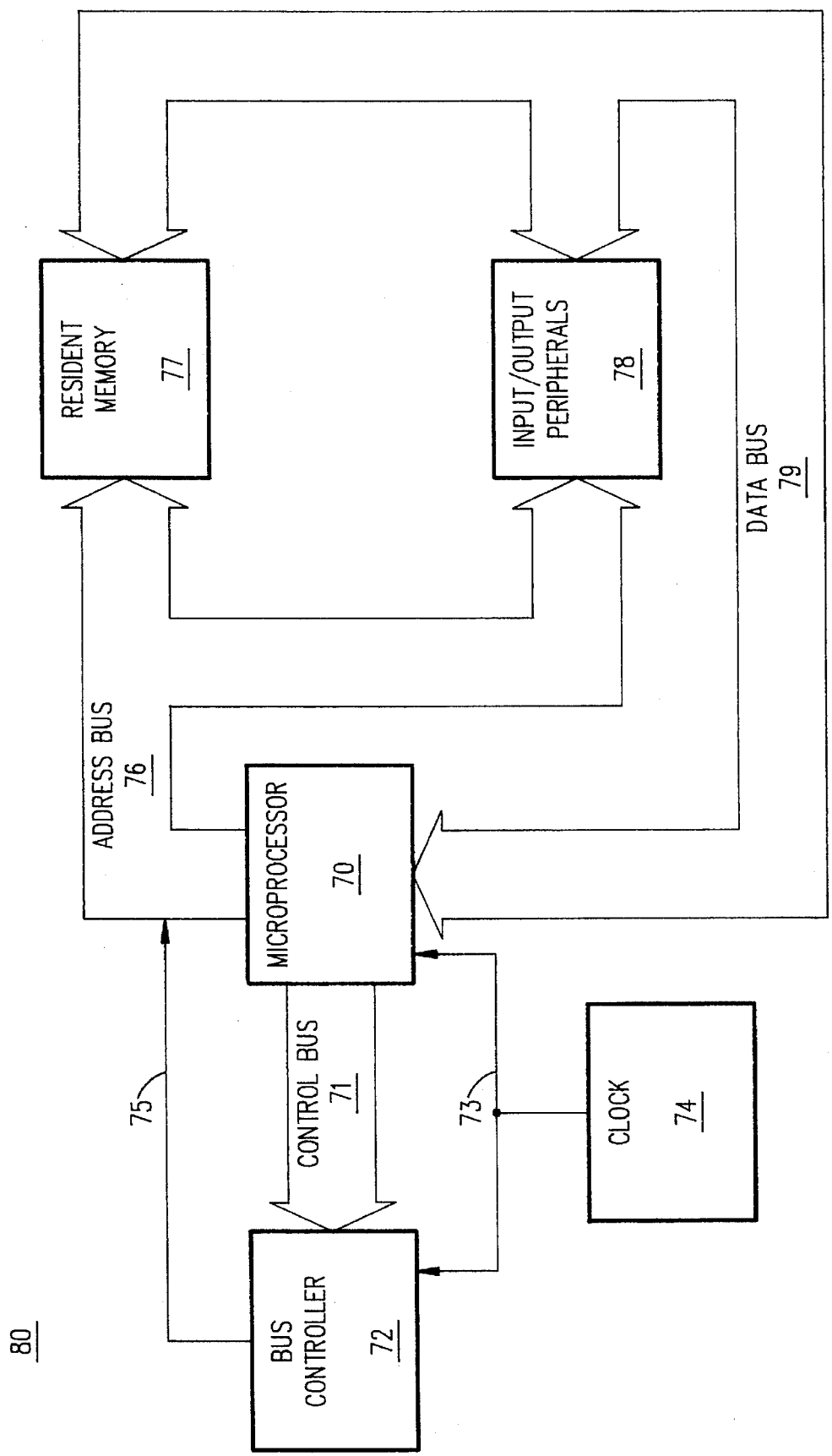
FIG. 7 is a functional block diagram of a computer including an I/O peripheral block according to the present invention.

Referring to FIG. 7, there is shown a functional block diagram of a typical computer 80 that may be used in conjunction with the present invention. Computer 80 comprises bus controller 72, micro-processor 70, controller bus 71, address bus 76, data bus 79, resident memory 77, (e.g., ROM/RAM), input/output peripherals 78, clock 74, system clock signal 73, and command control signal 75. In order to avoid confusion while enabling those skilled in the art to practice the claimed invention, this specification omits many details with respect to computer 80. Input/output (I/O) peripherals 78 are shown in more detail in FIG. 8.

Figure 8:
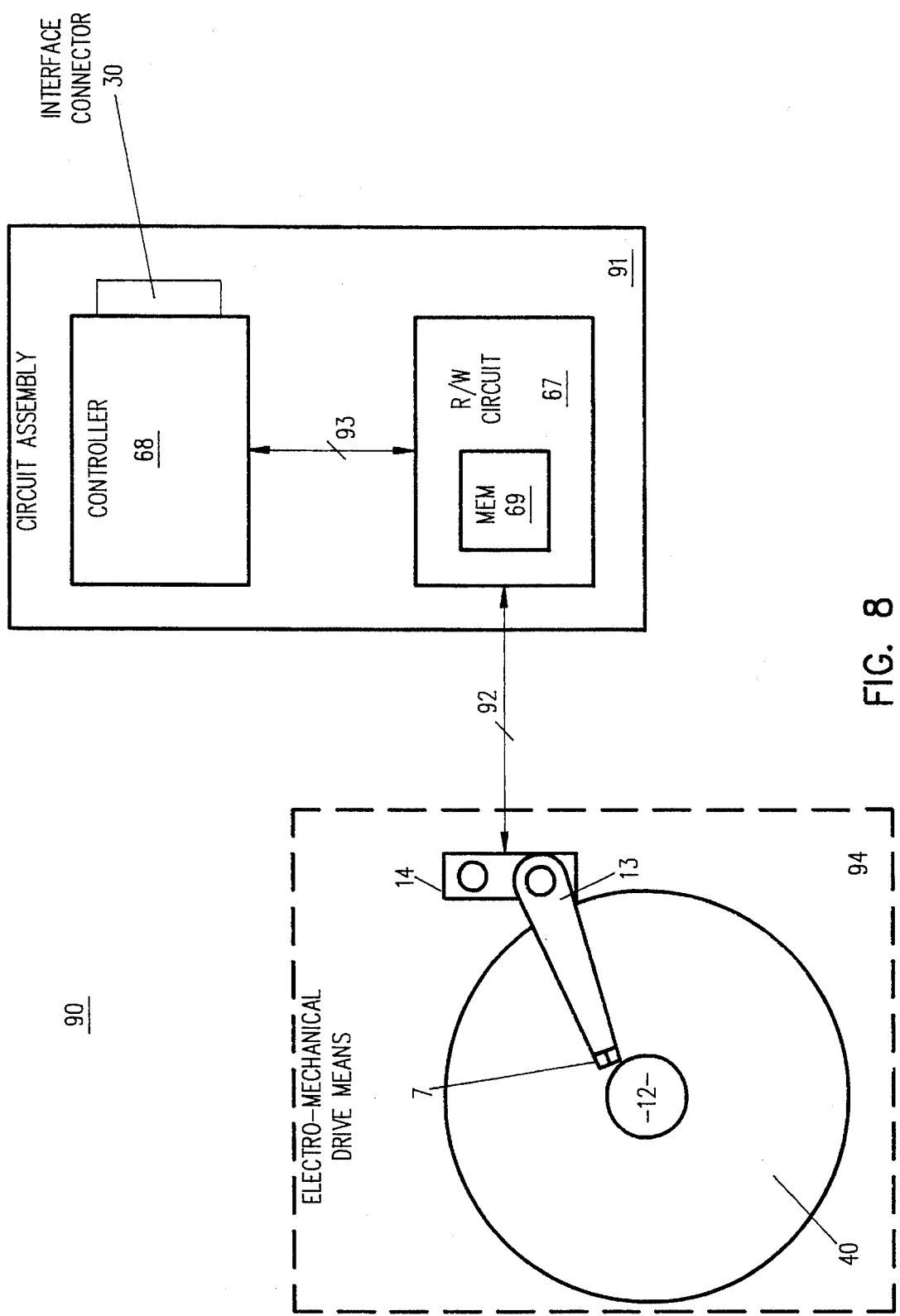
FIG. 8 is a schematic representation of a portion of the I/O peripheral block shown in FIG. 7 illustrating relationships between various elements in accordance with the present invention.

Referring to FIG. 8, there is shown a functional block diagram of a hard-disk drive system 90, according to the present invention. System 90 comprises drive electro-mechanical means 94 and circuit assembly 91. Drive means 94 may include disk 40, spindle 12, dual element head assembly 7 (e.g. comprising separate reader element 6 and writer element 5, as illustratively shown in FIGS. 3 and 4), actuator arm 13, and servomotor 14. Also included in system 90 but not shown may be an electric motor for driving spindle 12. In order to avoid confusion while enabling those skilled in the art to practice the claimed invention, this specification omits many details with respect to system 90. However, it should be understood that the present invention may be practiced with any of a variety of hard-disk drives.

Circuit assembly 91 may comprise controller 68, circuitry 67, and interface connector 30. Interface connector 30 is for coupling signals to and from data bus 79 (see, FIG. 7) from and to circuit assembly 91. Interface connector 30 is also for coupling signals to and from address bus 76 (see, FIG. 7) from and to circuit assembly 91. Signals are communicated between circuitry 67 and controller 68 through first signal pathways 93. Moreover, signals are communicated between circuit assembly 91 and drive means 94 through second signal pathways 92.

Circuitry 67 may comprise read and write circuits, timing and control logic circuits, actuator servocontrol circuits, and other well-known circuitry, including servo position error circuitry. Circuitry 67 also may comprise resident memory 69. Resident memory 69 may be any of a variety of memories known in the art including ROMs, PROMs, EPROMs, EEPROMs or any of a variety of other well-known memory devices. In accordance with the present invention, memory 69 may include computer instruction code for drive means 94.

Figure 6:
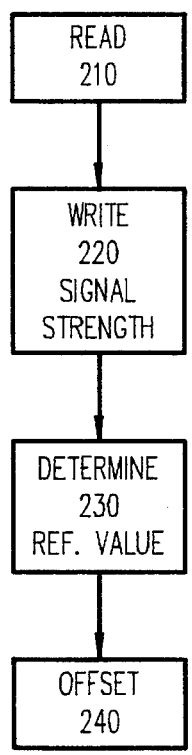
FIG. 6 is a flow diagram according to a method of the present invention.

Referring to FIG. 6, there is shown a flow diagram illustrating steps for self-calibration according to the present invention. The self-calibration procedure is for disk surfaces previously written to by a servowriter. Thus, servo burst areas, corresponding to areas 101 through 104, have previously been written to disk surface 47.

At step 210 the hard-disk drive is instructed to read, e.g., with the reader element. The element to be used for reading is positioned according to defined locations, e.g., centerlines. These defined locations are determined by the servo burst areas previously written to a disk surface. These servo burst areas may be on a dedicated servo disk. Alternatively, the servo burst areas may be embedded servo signals on "data" disks.

At step 210, by reading, indications of signal strength will be obtained as described above. Signal strength may be determined from automatic gain control circuitry or from an average amplitude of retrieved signals.

After reading in step 210, at step 220 the hard-disk drive is instructed to write, e.g., with the writer element, the signal strength indications to disk surface 47. The positioning of the element used for writing is determined by the positioning of the element used for reading. The signals written to the disk surface comprise first and second values. These values may be written to scratch pad sectors.

At step 230, the first and second values are used to provide a reference value. This reference value provides a reference line corresponding to the element used for writing. If this reference line is different from an associated reference line for the element used for reading, the difference is the amount of offset adjustment.

At step 240, the hard-disk drive is instructed to offset one of the elements by the difference between the reference line used for reading and the reference line for the element used for writing.

In this manner, after system 90 (see FIG. 8) has left the manufacturing facility, code provided in memory 69 ,nay be used to determine offsets for drive means 94. Variations in performance of drive means 94 due to environmental changes may be compensated for with respect to offsets between writer element 5 and reader element 6 of dual element head assembly 7 (see FIG. 4).

It should further be understood that the instruction code need not reside in memory 69 on circuit assembly 91. For example, instruction code for practicing the method of the claimed invention may reside in: memory in computer 80 (see FIG. 7).

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

What is claimed is:

1. Method for self-calibration of a read to write offset of a hard-disk drive, the hard-disk drive having at least one disk, at least one dual element head assembly for each said disk and a servocontrol system, the dual element head assembly having a separate, spaced apart reader element and writer element, the method comprising the steps of:

writing servo information to tracks on the disk, the servo information including a first, a second, and a third servo burst, the first and the second servo burst forming a first servo burst pair, the second and the third servo burst forming a second servo burst pair;

moving and aligning the reader element to the first servo burst pair;

reading the servo information from the first servo burst pair with the reader element;

writing a first servo offset burst to the disk with the writer element while the reader element is aligned to the first servo burst pair, the first servo offset burst being written at a same frequency as the first servo burst pair, the first servo offset burst indicating where the writer element was when the reader element was reading the servo information from the first servo burst pair;

moving and aligning the reader element to the second servo burst pair;

reading the servo information from the second servo burst pair with the reader element;

writing a second servo offset burst to the disk with the writer element while the reader element is aligned to the second servo burst pair, the second servo offset burst being written at a same frequency as the second servo burst pair, the second servo offset burst indicating where the writer element was when the reader element was reading the servo information from the second servo burst pair;

determining an error value from the first servo offset burst and the second servo offset burst; and comparing the error value with a servo value from the servo information to determine the read to write offset as between the reader element and the writer element.

2. The method of claim 1 wherein the read to write offset is used by the servocontrol system for trackwise alignment of the reader and the writer element.

3. The method of claim 2 wherein the hard-disk drive includes a plurality of disks and a plurality of dual head assemblies for a one-to-one correspondence between the disks and the dual head assemblies.

4. The method of claim 3 wherein at least one of the plurality of disks includes the servo information.

5. The method of claim 3 wherein each of the plurality of disks includes the servo information.

6. The method of claim 1 wherein the tracks on the disk have a pattern, the pattern being selected from the group consisting of one servo track for each data track and two servo tracks for each data track.

7. The method of claim 1 wherein the error value is determined by a means for determining a mid-point between the first servo burst and the second servo burst.

8. The method of claim 7 wherein the means for determining the mid-point is selected from the group consisting of subtraction, bisection and linear interpolation.

9. The method of claim 1 wherein there is no change in commutation of the servocontrol system for finding the read to write offset.

10. The method of claim 1 wherein the servocontrol system changes commutation in order to find the read to write offset.

11. Method for self-calibration of an offset of a disk drive, the disk drive having at least one disk, at least one dual element head assembly for the disk and a servocontrol system, the dual element head assembly having a separate, spaced apart first element and second element, the method comprising the steps of:

writing servo information to the disk, the servo information including at least a first, a second, and a third servo burst, the first and the second servo burst forming a first servo burst pair, the second and the third servo burst forming a second servo burst pair;

moving and centering the first element to the first servo burst pair;

reading the servo information from the first servo burst pair with the first element;

writing a first servo offset burst to the disk with the second element while the first element is centered to the first servo burst pair, the first servo offset burst being written at a same frequency as the first servo burst pair, the first servo offset burst indicating where the second clement was when the first element was reading the servo information from the first servo burst pair;

moving and centering the first element to the second servo burst pair;

reading the servo information from the second servo burst pair with the first element;

writing a second servo offset burst to the disk with the second element while the first element is centered to the second servo burst pair, the second servo offset burst being written at a same frequency as the second servo burst pair, the second servo offset burst indicating where the second dement was when the first dement was reading the servo information from the second servo burst pair;

determining an error value from the first servo offset burst and the second servo offset burst; and comparing the error value with a servo value from the servo information to determine the offset as between the first element and the second element.

12. The method of claim 11 wherein the offset is used by the servocontrol system for trackwise alignment of the first and the second element.

13. The method of claim 11 wherein the disk drive includes a plurality of disks and a plurality of dual head assemblies for a one-to-one correspondence between the disks and the dual head assemblies.

14. The method of claim 13 wherein at least one of the plurality of disks includes the servo information.

15. The method of claim 13 wherein each of the plurality of disks includes the servo information.

16. The method of claim 11 wherein the disk has tracks, the tracks on the disk having a pattern, the pattern being selected from the group consisting of one servo track for each data track and two servo tracks for each data track.

17. The method of claim 11 wherein the error value is determined by a means for determining a mid-point between the first servo burst and the second servo burst.

18. The method of claim 17 wherein the means for determining the mid-point is selected from the group consisting of subtraction, bisection and linear interpolation.

19. The method of claim 11 wherein there is no change in commutation of the servocontrol system for finding the read to write offset.

20. The method of claim 11 wherein the servocontrol system changes commutation in order to find the read to write offset.

21. Apparatus for self-calibration of a read to write offset of a hard-disk drive, the hard-disk drive having at least one disk, at least one dual element head assembly for each said disk and a servocontrol system, the dual element head assembly having a separate, spaced apart reader element and writer element, the apparatus comprising:

means for writing servo information to tracks on the disk, the servo information including a first, a second, and a third servo burst, the first and the second servo burst forming a first servo burst pair, the second and the third servo burst forming a second servo burst pair;

means for moving and aligning the reader element to the first servo burst pair;

means for reading the servo information from the first servo burst pair with the reader element;

means for writing a first servo offset burst to the disk with the writer element while the reader element is aligned to the first servo burst pair, the first servo offset burst being written at a same frequency as the first servo burst pair, the first servo offset burst indicating where the writer element was when the reader element was reading the servo information from the first servo burst pair;

means for moving and aligning the reader element to the second servo burst pair;

means for reading the servo information from the second servo burst pair with the reader element;

means for writing a second servo offset burst to the disk with the writer element while the reader element is aligned to the second servo burst pair, the second servo offset burst being written at a same frequency as the second servo burst pair, the second servo offset burst indicating where the writer element was when the reader element was reading the servo information from the second servo burst pair;

means for determining an error value from the first servo offset burst and the second servo offset burst; and means for comparing the error value with a servo value from the servo information to determine the read to write offset as between the reader element and the writer element.

22. The apparatus of claim 21 wherein the read to write offset is used by the servocontrol system for trackwise alignment of the reader and the writer element.

23. The apparatus of claim 22 wherein the hard-disk drive includes a plurality of disks and a plurality of dual head assemblies for a one-to-one correspondence between the disks and the dual head assemblies.

24. The apparatus of claim 23 wherein at least one of the plurality of disks includes the servo information.

25. The apparatus of claim 23 wherein each of the plurality of disks includes the servo information.

26. The apparatus of claim 21 wherein the tracks on the disk have a pattern, the pattern being selected from the group consisting of one servo track for each data track and two servo tracks for each data track.

27. The apparatus of claim 21 wherein the error value is determined by a means for determining a mid-point between the first servo burst and the second servo burst.

28. The apparatus of claim 27 wherein tile means for determining the midpoint is selected from the group consisting of subtraction, bisection and linear interpolation.

29. The apparatus of claim 21 wherein there is no change in commutation of the servocontrol system for finding tile read to write offset.

30. The apparatus of claim 21 wherein the servocontrol system changes commutation in order to find the read to write offset.

31. Apparatus for self-calibration of an offset of a disk drive, the disk drive having at least one disk, at least one dual element head assembly for the disk and a servocontrol system, the dual element head assembly having a separate, spaced apart first element and second element, the apparatus comprising:

means for writing servo information to the disk, the servo information including at least a first, a second, and a third servo burst, the first and the second servo burst forming a first servo burst pair, the second and the third servo burst forming a second servo burst pair;

means for moving and centering the first element to the first servo burst pair;

means for reading the servo information from the first servo burst pair with the first element;

means for writing a first servo offset burst to the disk with the second element while the first element is centered to tile first servo burst pair, the first servo offset burst being written at a same frequency as tile first servo burst pair, the first servo offset burst indicating where the second element was when the first element was reading the servo information from the first servo burst pair;

means for moving and centering the first element to the second servo burst pair;

means for reading the servo information from the second servo burst pair with the first element;

means for writing a second servo offset burst to the disk with the second element while the first element is centered to the second servo burst pair, the second servo offset burst being written at a same frequency as the second servo burst pair, the second servo offset burst indicating where the second element was when the first element was reading the servo information from the second servo burst pair;

means for determining an error value from the first servo offset burst and the second servo offset burst; and means for comparing the error value with a servo value from the servo information to determine the offset as between the first element and the second dement.

32. The apparatus of claim 31 wherein the offset is used by the servocontrol system for trackwise alignment or the first and the second element.

33. The apparatus of claim 31 wherein the disk drive includes a plurality of disks and a plurality of dual head assemblies for a one-to-one correspondence between the disks and the dual head assemblies.

34. The apparatus of claim 33 wherein at least one of the plurality of disks includes the servo information.

35. The apparatus of claim 33 wherein each of the plurality of disks includes the servo information.

36. The apparatus of claim 31 wherein the disk has tracks, the tracks on the disk having a pattern, the pattern being selected from the group consisting of one servo track for each data track and two servo tracks for each data track.

37. The apparatus of claim 31 wherein the error value is determined by a means for determining a mid-point between the first servo burst and the second servo burst.

38. The apparatus of claim 37 wherein the means for determining the midpoint is selected from tile group consisting of subtraction, bisection and linear interpolation.

39. The apparatus of claim 31 wherein there is no change in commutation of the servocontrol system for finding the read to write offset.

40. The apparatus of claim 31 wherein the servocontrol system changes commutation in order to find the offset.

* * * * *